United States Patent [19]

Insolio

[11] 4,201,104
[45] May 6, 1980

[54] GLASS CUTTER

[75] Inventor: Thomas A. Insolio, Bristol, Conn.

[73] Assignee: The Fletcher-Terry Company, Farmington, Conn.

[21] Appl. No.: 959,329

[22] Filed: Nov. 9, 1978

[51] Int. Cl.$^2$ .................. B26D 3/08; C03B 33/10
[52] U.S. Cl. ........................... 83/886; 83/578; 83/699
[58] Field of Search ............... 83/886, 884, 885, 578, 83/699

[56] References Cited

U.S. PATENT DOCUMENTS

| | | | |
|---|---|---|---|
| 2,513,876 | 7/1950 | Judd, Jr. | 83/886 X |
| 3,136,191 | 6/1964 | Madge | 83/578 X |

Primary Examiner—Frank T. Yost
Attorney, Agent, or Firm—McCormick, Paulding & Huber

[57] ABSTRACT

A glass cutter of the type having a pillar post capable of limited angular movement about a vertical axis is disclosed. The pillar post is provided in a conventional head which is adapted to traverse a glass sheet in one and an opposite direction, and the glass cutter can score in both directions because the tool is designed to trail this vertical axis, and thereby provide a castering action in both directions. The tool is mounted in a small pendulum which is gravity biased to assume a ready position such that traversing movement of the head and pillar post in one direction, in conjunction with engagement between the tool and the edge of the glass sheet itself, moves or swings the pendulum to a first limit position such that the tool trails the said vertical axis achieving the above castering action. Traversing movement of the head and pillar post in the opposite direction swings the pendulum to a second limit position which is the mirror image of the first position achieving a castering action during return movement of the head.

10 Claims, 6 Drawing Figures

GLASS CUTTER

BACKGROUND OF THE INVENTION

This invention relates generally to glass cutters, and deals more particularly with a pillar post for use in a machine of the type having a head movable relative to the glass sheet in order to score the sheet in at least one direction. Such glass cutters generally provide for the scoring of glass in only one direction, and this because of the necessity for a castering action in the pillar post itself so as to assure proper alignment between the glass cutting wheel and the direction of score. Thus, in a glass cutting operation wherein pieces of glass are to be cut from a large sheet, the cutting head is used to cut or score the glass in only one direction, and typically, the cutting head is lifted or retracted away from the glass sheet and returned to the "start of cut" side of the glass sheet in order to initiate a second traversal of the sheet for scoring purposes.

The chief aim of the present invention is to provide an improved glass cutter configuration wherein the necessity for non-productive return motion of the head is eliminated, and scoring of the glass sheet in both directions is possible. The improved glass cutter also permits scoring of the glass sheet without altering the head for realignment of the like prior to moving the head in the opposite or return direction.

SUMMARY OF THE INVENTION

In accordance with the present invention the glass cutter is provided in a head of the type adapted to traverse a glass sheet in one direction and which is also able to return in the opposite direction. The glass cutter comprises a depending holder mounted in the head for limited angular movement about a vertical axis defined in the head, for purposes of aligning the scoring tool with the direction of movement of the head as it traverses the sheet. The holder defines a downwardly open rectangular slot, and a movable member or pendulum is provided in the slot. The pendulum has an upper surface with two discrete segments for selectively cooperating with the upper or inner portion of the holder slot in order to define two discrete limit positions for the pendulum. A glass scoring wheel is carried by the pendulum for scoring the glass sheet, and a pin is provided for pivotally supporting the pendulum member in the holder slot for movement between these limit positions. The pendulum normally hangs downwardly between these two limit positions and is only moved to one or the other of said two positions in response to motion of the glass cutter and its associated head in one and an opposite or return direction relative to the glass sheet being scored.

DETAILED DESCRIPTION

Figure 1:
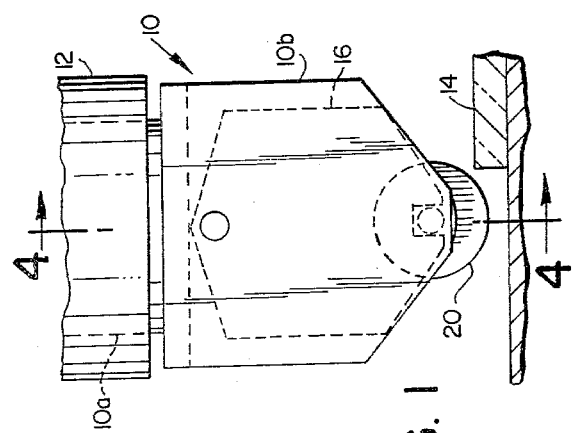
FIG. 1 is a side elevational view of the lower portion of a typical pillar post equipped with a glass cutter of the present invention, and also shows in pertinent part a conventional glass cutting head of the type adapted to traverse a glass sheet at least in one and an opposite or return direction. The head may also be adapted for limited angular movement of the pillar post about a vertical axis in order to permit the scoring wheel to align itself with the direction of motion for the head.

Turning now to the drawing in greater detail, FIG. 1 shows a pillar post 10 of the type having an upwardly projecting hollow stem portion 10a which is adapted to be mounted for limited angular rotation in a conventional glass cutting head 12 of the type used in a conventional glass cutting machine or table (not shown). In such a machine the head is adapted to traverse the table so as to score a glass sheet in at least one direction. The present disclosure relates to a novel glass cutter capable of scoring this glass sheet 14 not only in one direction, but also in a return direction as suggested in FIGS. 2 and 6 for example.

Still with reference to the pillar post 10 it will be apparent that the lower portion 10b comprises a holder means integrally connected to the upper stem portion 10a, which holder means defines a downwardly open rectangular slot 10c having an upper surface 10d and parallel inner side walls for slidably receiving a movable member or pendulum 16 to be described.

Figure 6:
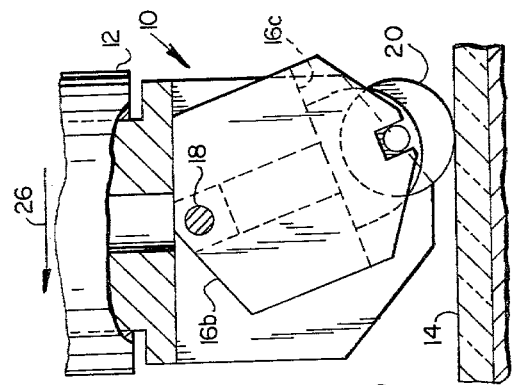
FIG. 6 is a view similar to FIG. 2 but with the movement of the glass cutter being in the opposite direction relative to the glass sheet, this view being substantially a mirror image of that of FIG. 2.
Figure 2:
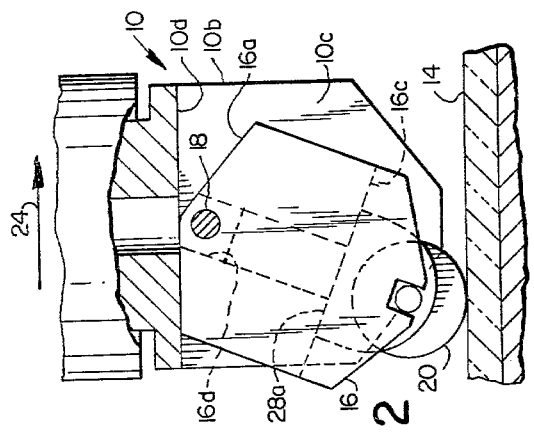
FIG. 2 is a side view partly in section illustrating the apparatus of FIG. 1 following contact between the glass scoring wheel and the glass sheet such that scoring is achieved as a result of movement of the glass cutter from left to right relative to the glass sheet.
Figure 5:
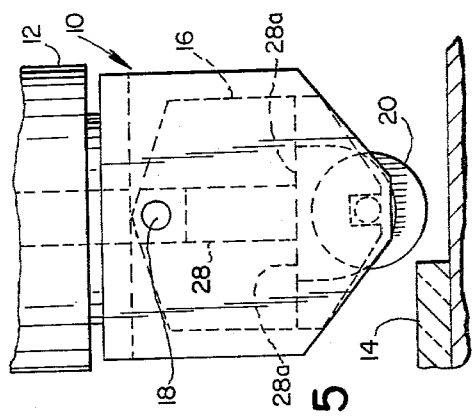
FIG. 5 is a view similar to FIG. 1 but illustrating the glass cutter at the opposite side of the glass sheet to be scored, the pendulum member being shown in somewhat greater detail by way of broken lines, said member being in a ready position in this view and also in the FIG. 1 view.

The pendulum member 16 is pivotally supported by means adjacent the surface 10d of the holder and more particularly midway between segments of this surface 10d such that the pendulum 16 can move between the limit positions shown for it in FIG. 2 and FIG. 6 in order to achieve the castering action for the scoring wheel in a manner to be described. The means for pivotally supporting the pendulum 16 comprises a pin 18 held in aligned openings provided for this purpose in the furcations of the holder 10b and loosely received in an opening defined in the upper portion of the pendulum 16. As so configured the pendulum 16 is adapted to be gravity biased toward the position for it in FIG. 1 and also in FIGS. 4 and 5, that is midway between the limit positions depicted in FIGS. 2 and 6. The upper surface of pendulum 16 defines angularly related surfaces 16a and 16b which surface segments are adapted to abut the inner, or downwardly facing, surface of the rectangular slot in the holder 10b such that these two limit positions for the pendulum can be defined with the scoring wheel 20 trailing the central vertical axis 22 of the pillar post when the glass cutting head is moved in the direction of the arrow 24 in FIG. 2 or in the direction of the arrow 26 in FIG. 6.

Figure 3:
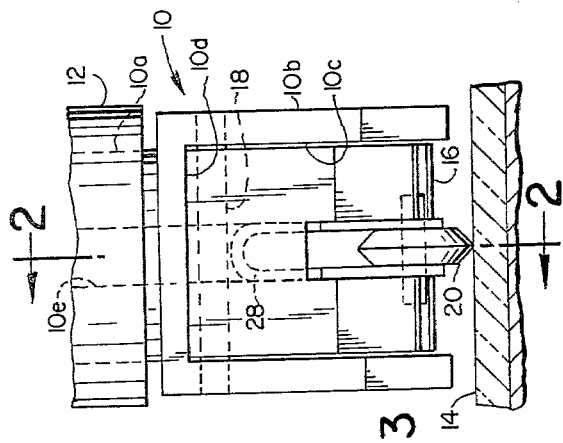
FIG. 3 is a rear view of the apparatus illustrated in FIG. 2.
Figure 4:
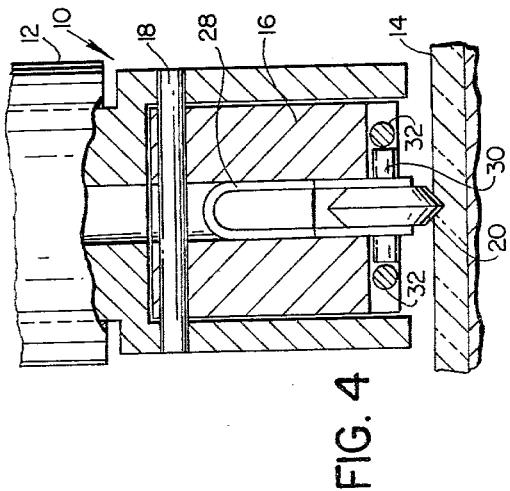
FIG. 4 is a sectional view taken generally on the line 4—4 of FIG. 1.

Turning next to more complete description of the pendulum 16 FIGS. 3 and 4 show this member having a width closely approximating that of the width of the rectangular slot defined by the holder 10b such that the pendulum can move on the pin 18 as described above. The pendulum member 16 includes its own downwardly open generally rectangular slot 16c for receiving a spring clip retainer of the type described in my issued U.S. Pat. No. 4,098,156 entitled "Glass Cutter With Long Axle And Retainer Holder". This retainer 28 is best shown in FIG. 4 and is preferably formed into a U-shape with leg portions which are spread apart slightly in their unstressed configuration so that as assembled with a wheel in the pendulum slot 16 they may be compressed slightly in order to retain the glass cutting wheel and the retainer, together with its associated axle 30, in the lower portion of the pendulum member 16 as shown. These leg portions of the retainer 28 define aligned openings for receiving the axle 30 and one of these openings may be somewhat larger than the other to permit the legs to be readily spread for insertion in and removal from the slot 16c. The U-shaped retainer and cross axle and scoring wheel are described in detail in the above mentioned patent and the reader is referred thereto for a more complete description of this aspect of the present disclosure. The axle 30 preferably has its end portions projecting beyond the legs of the retainer, again as best shown in FIG. 4, and the axle may be further restrained by cross pins 32, 32 permanently secured in the lower end of the pendulum member 16. The U-shaped retainer 28 is preferably formed with a shoulder, as best shown at 28a in FIGS. 2 and 5, such that this shoulder engages an inner, or downwardly facing surface of the rectangular slot 16c in the pendulum in order to properly locate the retainer in its associated pendulum.

Lubrication for the cutting wheel 20 is provided from a suitable source associated with the head 12 by means of a central bore 10e in the stem portion 10a of the pillar post. The bore 10e extends downwardly into the holder portion 10b and communicates with a central opening 16d provided for this purpose in the pendulum 16 in order to provide a passageway for the delivery of cutting fluid, such as kerosene, to the scoring wheel 20. This fluid also provides lubrication for the pivotal connection between the pendulum 16 and the pin 18, thereby assuring free pivotal or pendulous movement of the member 16 as described above.

I claim:

1. A glass cutter for use in a glass cutting machine having a head adapted to traverse a glass sheet in one direction and to return in the opposite direction, said glass cutter comprising depending holder means mounted in the head for limited angular movement about a vertical axis said holder means defining a downwardly open slot, a movable member in said slot and having an upper surface with two discrete segments for selectively cooperating with upper portions of the inner surface of said holder means slot, a glass engageable tool carried by said movable member for scoring the glass sheet, means pivotally supporting said member in said holder means slot for pendulous movement in said slot between two limit positions defined by the abutment between said upper surface portions of said holder means slot and said two discrete segments of said member respectively, whereby said member is moved to one of said two limit positions while said tool is in contact with the glass sheet in response to traversing motion of said holder member in one direction and to the other of said two limit positions in response to motion of said holder means in the return direction again while said tool is in contact with glass sheet.

2. The combination defined in claim 1 wherein said movable member has flat parallel sides and a bore opening to said sides and said slot in said holder being rectangular to receive said member for pendulous movement therebetween, said means pivotally supporting said movable member comprising a pin having end portions secured in aligned openings in the holder means and an intermediate portion of said pin loosely received in said bore, said sligned openings in said holder means being oriented perpendicular to said vertical axis in the head.

3. The combination defined in claim 2 wherein said pin in said aligned openings in said holder means is located midway between said two segments on said movable member, said segments defined on the upper surface of said member, said surface of said holder means for abutting said segments comprising the upper surface of said rectangular slot in said holder means.

4. The combination defined in claim 3 wherein said holder means defines a central bore on said vertical axis to provide a passageway for lubricating oil to the glass engageable tool, and a central vertical opening in said pivotally movable member communicating with said passageway defining bore, said pin extending across said central opening and said limit positions for said pivotally mounted member defined at equal angular displacements for a center-rest position wherein said pivotally mounted member is biased to a downwardly hanging position with said tool located on the central axis of said passageway bore.

5. The combination defined in claim 3 wherein said movable member comprises a bifurcated member defining a downwardly open retainer slot between the furcations thereof, a generally U-shaped retainer having resilient legs with aligned openings and located in said slot, a glass scoring wheel axle fitted in said retainer, said tool comprising a glass scoring wheel on said axle.

6. The combination defined in claim 5 wherein said axle has end portions projecting beyond said retainer legs and received in a cross slot oriented at right angles to said downwardly open slot for said retainer, and spaced pins in said furcations extending across said cross axle slot for engaging said end portions and restraining said axle against movement in its slot in order to cause said axle to bear against the inner wall of said cross axle slot while the head traverses the glass sheet.

7. The combination defined in claim 1 wherein said surface of said holder means for abutting said segments on said member comprises the upper surface of said downwardly open slot, and wherein said discrete segments are both defined on the upper surface of said pivotally supported member.

8. The combination defined in claim 7 wherein said movable member comprises a bifurcated member defining a downwardly open retainer slot between the furcations thereof, a generally U-shaped retainer having resilient legs with aligned openings and located in said slot, a glass scoring wheel axle fitted in said retainer, said tool comprising a glass scoring wheel on said axle.

9. The combination defined in claim 1 wherein said movable member comprises a bifurcated member defining a downwardly open retainer slot between the furcations thereof, a generally U-shaped retainer having resilient legs with aligned openings and located in said slot, a glass scoring wheel axle fitted in said retainer, said tool comprising a glass scoring wheel on said axle.

10. The combination defined in claim 9 wherein said axle has end portions projecting beyond said retainer legs and received in a cross slot oriented at right angles to said downwardly open slot for said retainer, and spaced pins in said furcations extending across said cross axle slot for engaging said end portions and restraining said axle against movement in its slot in order to cause said axle to bear against the inner wall of said cross axle slot while the head traverses the glass sheet.

* * * * *